US010255813B2

United States Patent
Lim et al.

(10) Patent No.: US 10,255,813 B2
(45) Date of Patent: *Apr. 9, 2019

(54) MOVING OBJECT COLLISION WARNING SYSTEM AND METHOD FOR LARGE VEHICLE

(71) Applicant: PLK Technologies Co., Ltd., Seoul (KR)

(72) Inventors: Sang Mook Lim, Seoul (KR); Jin Hyuck Kim, Seoul (KR); Kwang Il Park, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,294

(22) Filed: Sep. 21, 2017

(65) Prior Publication Data

US 2018/0102055 A1 Apr. 12, 2018

(30) Foreign Application Priority Data

Oct. 11, 2016 (KR) .......................... 10-2016-0131437

(51) Int. Cl.
*B60Q 9/00* (2006.01)
*B60T 7/22* (2006.01)
(Continued)

(52) U.S. Cl.
CPC ............. *G08G 1/166* (2013.01); *B60Q 9/008* (2013.01); *B60T 7/22* (2013.01); *G06K 9/00805* (2013.01);
(Continued)

(58) Field of Classification Search
CPC ............. G06K 9/00805; G06K 9/6215; G06K 9/6269; G06K 9/4604; G06K 9/4647;
(Continued)

(56) References Cited

U.S. PATENT DOCUMENTS

| 9,718,405 | B1* | 8/2017 | Englander | B60Q 9/008 |
| 2013/0300897 | A1* | 11/2013 | Kanamoto | G06K 9/4647 |
| | | | | 348/231.99 |
| 2014/0133701 | A1* | 5/2014 | Ma | G06T 7/2033 |
| | | | | 382/103 |

FOREIGN PATENT DOCUMENTS

| JP | 58-185352 A | 10/1983 |
| JP | 2001-315601 A | 11/2001 |

(Continued)

OTHER PUBLICATIONS

Joko (Moving Object Localization Using Optical Flow for Pedestrian Detection from a Moving Vehicle, Scientific World Journal, Published Jul. 10, 2014).*

*Primary Examiner* — Christopher S Kelley
*Assistant Examiner* — Nasim N Nirjhar
(74) *Attorney, Agent, or Firm* — Rabin & Berdo, P.C.

(57) ABSTRACT

A moving object collision warning system for a large vehicle may include: a rear camera module mounted on the rear of at least one side of a large vehicle, and configured to take an image of an object while facing the front of the large vehicle; an image receiving unit configured to receive the image taken by the rear camera module; a moving object determination unit configured to recognize the image received by the image receiving unit, extract an object included in the image, and determine whether the extracted object is a moving object, wherein the moving object includes one or more of a bicycle, a two-wheeled vehicle and a pedestrian; a moving object collision possibility determination unit configured to determine whether the moving object determined by the moving object determination unit is located in a preset danger zone, and output a collision risk signal; a warning unit configured to output a visual or audible warning signal to a driver of the large vehicle; and a control unit configured to operate the warning unit when the moving (Continued)

object collision possibility determination unit outputs the collision risk signal.

18 Claims, 8 Drawing Sheets

(51) Int. Cl.
  *G06K 9/00* (2006.01)
  *G06K 9/46* (2006.01)
  *G06K 9/62* (2006.01)
  *G08G 1/16* (2006.01)
  *H04N 7/18* (2006.01)
(52) U.S. Cl.
  CPC ......... *G06K 9/4604* (2013.01); *G06K 9/4642* (2013.01); *G06K 9/6201* (2013.01); *G06K 9/6212* (2013.01); *G06K 9/6215* (2013.01); *G06K 9/6269* (2013.01); *G08G 1/167* (2013.01); *H04N 7/181* (2013.01); *B60T 2201/022* (2013.01); *B60T 2210/34* (2013.01)

(58) Field of Classification Search
  CPC .... G08G 1/166; H04N 7/181; H04N 5/23293; H04N 5/907; B60R 1/00; B60R 2300/8093; B60R 2300/802; B60R 11/04; H04W 4/80; G06T 2207/10004; G06T 2207/30261; G06T 2207/20021; G06T 7/13; G06T 7/248
  See application file for complete search history.

(56) References Cited

FOREIGN PATENT DOCUMENTS

| | | |
|---|---|---|
| JP | 2010-244128 A | 10/2010 |
| JP | 2011-013838 A | 1/2011 |
| JP | 2016-051371 A | 4/2016 |
| KR | 10-2016-0045857 A | 4/2016 |

\* cited by examiner

MOVING OBJECT COLLISION WARNING SYSTEM AND METHOD FOR LARGE VEHICLE

TECHNICAL FIELD

The present disclosure relates to a moving object collision warning system and method for a large vehicle, which is capable of identifying a moving object such as a bicycle, two-wheel vehicle or pedestrian in a turning radius of a large vehicle making a turn, and issuing a warning to a driver or emergency-braking the large vehicle, thereby preventing a loss of life.

BACKGROUND ART

The AVMS (Around View Monitoring System) refers to a system that includes a plurality of cameras installed on a vehicle, recognizes an obstacle around the vehicle through an image taken by a camera, and estimates and warns of a collision risk with an obstacle located in a blind spot of a driver. Recently, the AVMS tends to be installed in expensive high-quality vehicles.

However, since a large vehicle such as a cargo truck, trailer or bus has a large full length, the large vehicle needs more cameras to apply the AVMS, and requires a more complex image recognition technique than general cars, in order to recognize images taken by the respective cameras. Such requirements make it difficult to apply the AVMS to a large vehicle. Therefore, while general cars have two side mirrors mounted thereon, more and more large vehicles include six side mirrors to widen a driver's monitoring range for a side rear blind spot.

FIG. 1 is a plan view illustrating that a large vehicle makes a turn at a crossroads. As illustrated in FIG. 1, when a bicycle 200 running in parallel to the large vehicle 100 is at the right rear of the large vehicle 100 while the large vehicle 100 tries to make a right turn, the bicycle 200 may not come in sight of a driver. Since the large vehicle 100 has a large full length, the bicycle 200 may come in contact with a side frame of the large vehicle 100, even though the bicycle 200 does not collide with a front wheel of the large vehicle 100. Then, the bicycle 200 may fall while losing the balance. In this case, while the rear wheel of the large vehicle 100 runs over a bicycle rider on a turn path of the large vehicle 100, the bicycle rider may die or receive a severe injury.

Such an accident does not frequently occur. However, when such an accident occurs, the accident is highly likely to cause a loss of life even though the large vehicle runs at low velocity. More specifically, when the large vehicle makes a turn along a walkway, a driver of the large vehicle may not recognize a bicycle, two-wheeled vehicle or pedestrian that has a smaller size and moves at lower velocity than the large vehicle, and thus cause an accident. In this case, as illustrated in FIG. 1, a danger zone 300 is formed in a triangular shape which is wide at the side front of the large vehicle and narrow at the side rear of the large vehicle. Since such an accident has a high death frequency, the accident needs to be prevented.

As illustrated in FIG. 2, the conventional large vehicle may include a short range radar (SRR) 110 mounted at the side front thereof, in order to monitor a moving object such as a bicycle 200 at the side rear thereof. Referring to FIG. 2, the SRR has a monitoring zone 120 of which the measurement angle is large while the measurement distance thereof is short. Thus, the SRR may widen the zone for monitoring the side rear of a passenger seat (or driver seat). However, when the moving object such as the bicycle 200 is located out of the monitoring zone 120 because the SRR does not cover the entire part of the danger zone 300 illustrated in FIG. 1, the driver cannot monitor the moving object. Furthermore, a large vehicle such as a trailer has a cargo bed made of a metallic material. Therefore, when the SRR is installed at the side rear of the vehicle, the SRR may have a difficulty in detecting a small bicycle due to propagation interference or the like.

Korean Patent Publication No. 2016-0045857 discloses a technique capable of detecting an object using a 3D camera and radar. However, the technique may have a difficulty in detecting a bicycle, two-wheeled vehicle or pedestrian in the turning radius of a large vehicle, even though the installation locations of the 3D camera and radar are differently applied and the object detection method is used. Therefore, the technique still has the above-described problems.

DISCLOSURE

Technical Problem

Various embodiments are directed to a moving object collision warning system and method for a large vehicle, which is capable of correctly identifying a moving object such as a bicycle, two-wheel vehicle or pedestrian in a turning radius of a large vehicle making a turn along a walkway, and issuing a warning to a driver or emergency-braking the large vehicle, thereby preventing a collision accident having a high death frequency between the moving object and the large vehicle at low speed.

Technical Solution

In an embodiment, a moving object collision warning system for a large vehicle may include: a rear camera module mounted on the rear of at least one side of a large vehicle, and configured to take an image of an object while facing the front of the large vehicle; an image receiving unit configured to receive the image taken by the rear camera module; a moving object determination unit configured to recognize the image received by the image receiving unit, extract an object included in the image, and determine whether the extracted object is a moving object, wherein the moving object includes one or more of a bicycle, a two-wheeled vehicle and a pedestrian; a moving object collision possibility determination unit configured to determine whether the moving object determined by the moving object determination unit is located in a preset danger zone, and output a collision risk signal; a warning unit configured to output a visual or audible warning signal to a driver of the large vehicle; and a control unit configured to operate the warning unit when the moving object collision possibility determination unit outputs the collision risk signal.

The moving object possibility determination unit outputs a first collision risk signal when the moving object is located in the danger zone, and outputs a second collision risk signal when a change in steering angle of a steering wheel of the large vehicle is sensed while the first collision risk signal is outputted.

The control unit operates a visual warning unit of the warning unit in response to the first collision risk signal, and operates an audible warning unit of the warning unit in response to the second collision risk signal.

The moving object collision warning system may further include an emergency braking unit configured to emergency-brake the large vehicle, wherein the control unit operates the emergency braking unit in response to the second collision risk signal.

The moving object determination unit may include: an object extraction module configured to extract one or more objects from the image received by the image receiving unit; a moving object candidate detection module configured to detect an edge of the object extracted by the object extraction module, and detect the object as a moving object candidate when the object has an area equal to or more than a predetermined size distinguished by the edge; a mobility determination module configured to detect a motion of the moving object candidate by comparing the current frame of the image taken by the rear camera module to a previous frame before the current frame, and determine that the moving object candidate is moving, when the motion is detected; and a moving object possibility determination module configured to perform a HOG (Histogram of Oriented Gradient) operation on the moving object candidate when the mobility determination module determines that the moving object candidate is moving, perform an SVM (Support Vector Machine) weight operation on the HOG operation result, and set the moving object candidate to a moving object when the operation result is equal to or more than a preset threshold value.

The moving object candidate detection module detects a vertical component of the edge of the object, and determines a similarity between the vertical component and a predefined pattern of the moving object, in order to detect the moving object candidate.

The mobility determination module divides the current frame and the previous frame into a predetermined size of blocks, calculates the sum of differences in pixel value between a block including the moving object candidate in the current frame and a block including the moving object candidate in the previous frame, based on Equation 1 below, sets the block having the smallest sum of pixel value differences to the corresponding block of the previous block, and determines that the moving object candidate is moving, when the position of the corresponding block is changed:

$$SAD = \sum_{i=1}^{N} \sum_{j=1}^{M} |(I_{ij}(k) - I_{ij}(k-1)|, \quad \text{Equation 1}$$

where $I_{ij}(k)$ represents the pixel value of an i-th row and a j-th column of a block in a k-th image frame, and $I_{ij}(k-1)$ represents the pixel value of an i-th row and a j-th column of a block in the previous image frame before the k-th image frame.

The moving object collision possibility determination unit recognizes the contour point bottom of the moving object, calculates a vertical distance between the rear camera module and the moving object on the road based on Equation 2 below, and outputs the collision risk signal when the vertical distance ranges from the minimum danger distance and the maximum danger distance which are predefined in the vertical direction:

$$Z = \frac{fh}{y}, \quad \text{Equation 2}$$

where Z represents the vertical distance between the rear camera module and the moving object on the road, f represents a focal distance of the rear camera module, h represents the height of the rear camera module from the ground surface, and y represents a distance between the contour point bottom of the moving object and a vanishing point on a viewport filmed by the rear camera module.

The moving object collision possibility determination unit recognizes a contour point of the large vehicle and the contour point bottom of the moving object, calculates a horizontal distance between the large vehicle and the moving object on the road based on Equation 4 below, and outputs the collision risk signal when the horizontal distance is less than a predefined horizontal danger distance:

$$W = \frac{fw}{y}, \quad \text{Equation 4}$$

where W represents the horizontal distance between the large vehicle and the moving object on the road, f represents a focal distance of the rear camera module, w represents a horizontal distance between the contour point bottom of the moving object and the contour point of the large vehicle on a viewport taken by the rear camera module, and y represents a distance between the contour point bottom of the moving object and the vanishing point on the viewport filmed by the rear camera module.

The moving object collision possibility determination unit recognizes a contour point of the large vehicle and the contour point bottom of the moving object, calculates a vertical distance between the rear camera module and the moving object on the road based on Equation 2 below, calculates a horizontal distance between the large vehicle and the moving object on the road based on Equation 4 below, and outputs the collision risk signal when the vertical distance ranges from the minimum danger distance and the maximum danger distance which are predefined in the vertical direction and the horizontal distance is less than a predefined horizontal danger distance:

$$Z = \frac{fh}{y} \quad \text{Equation 2}$$

$$W = \frac{fw}{y}, \quad \text{Equation 4}$$

where Z represents the vertical distance between the rear camera module and the moving object on the road, f represents a focal distance of the rear camera module, h represents the height of the rear camera module from the ground surface, y represents a distance between the contour point bottom of the moving object and a vanishing point on a viewport filmed by the rear camera module, W represents the horizontal distance between the large vehicle and the moving object on the road, and w represents a horizontal distance between the contour point bottom of the moving object and the contour point of the large vehicle on the viewport taken by the rear camera module.

In another embodiment, a moving object collision warning method for a large vehicle may include the steps of: (a) receiving, by an image receiving unit, an image from a rear camera module which is mounted on the rear of at least one side of the large vehicle and takes an image of an object while facing the front of the large vehicle; (b) extracting, by a moving object determination unit, an object included in the received image, and determining whether the extracted object is a moving object, wherein the moving object includes one or more of a bicycle, a two-wheeled vehicle and a pedestrian; (c) outputting, by a moving object collision possibility determination unit, a collision risk signal when the moving object determined at the step (b) is located in a preset danger zone; and (d) outputting, by a warning unit, a visual or audible warning signal in response to the collision risk signal.

The step (c) may include the steps of: (c-1) outputting a first collision risk signal when the moving object is located in the danger zone; and (c-2) outputting a second collision risk signal when a change in steering angle of a steering wheel of the large vehicle is sensed while the condition of the step (c-1) is satisfied.

The step (d) may include outputting a visual warning signal in response to the first collision risk signal, and outputting an audible warning signal in response to the second collision risk signal.

The moving object collision warning method may further include emergency-braking, by an emergency braking unit, the large vehicle in response to the second collision risk signal, after the step (d).

The step (b) may include the steps of: (b-1) extracting one or more objects from the received image; (b-2) detecting an edge of the extracted object, and detecting the object as a moving object candidate when the object has an area equal to or more than a predetermined size distinguished by the edge; (b-3) detecting a motion of the moving object candidate by comparing the current frame of the image taken by the rear camera module to a previous frame before the current frame, and determining that the moving object candidate is moving, when the motion is detected; and (b-4) performing a HOG operation on the moving object candidate when it is determined at the step (b-3) that the moving object candidate is moving, performing an SVM weight operation on the HOG operation result, and setting the moving object candidate to a moving object when the operation result is equal to or more than a preset threshold value.

The step (b-2) may include detecting a vertical component of the edge of the object, and determining a similarity between the vertical component and a predefined pattern of the moving object, in order to detect the moving object candidate.

The step (b-3) may include dividing the current frame and the previous frame into a predetermined size of blocks, calculating the sum of differences in pixel value between a block including the moving object candidate in the current frame and a block including the moving object candidate in the previous frame, based on Equation 1 below, setting the block having the smallest sum of pixel value differences to the corresponding block of the previous block, and determining that the moving object candidate is moving, when the position of the corresponding block is changed:

$$SAD = \sum_{i=1}^{N} \sum_{j=1}^{M} |(I_{ij}(k) - I_{ij}(k-1))|, \quad \text{Equation 1}$$

where $I_{ij}(k)$ represents the pixel value of an i-th row and a j-th column of a block in a k-th image frame, and $I_{ij}(k-1)$ represents the pixel value of an i-th row and a j-th column of a block in the previous image frame before the k-th image frame.

The step (c) may include recognizing the contour point bottom of the moving object, calculating a vertical distance between the rear camera module and the moving object on the road based on Equation 2 below, and outputting the collision risk signal when the vertical distance ranges from the minimum danger distance and the maximum danger distance which are predefined in the vertical direction:

$$Z = \frac{fh}{y}, \quad \text{Equation 2}$$

where Z represents the vertical distance between the rear camera module and the moving object on the road, f represents a focal distance of the rear camera module, h represents the height of the rear camera module from the ground surface, and y represents a distance between the contour point bottom of the moving object and a vanishing point on a viewport filmed by the rear camera module.

The step (c) may include recognizing a contour point of the large vehicle and the contour point bottom of the moving object, calculating a horizontal distance between the large vehicle and the moving object on the road based on Equation 4 below, and outputting the collision risk signal when the horizontal distance is less than a predefined horizontal danger distance:

$$W = \frac{fw}{y}, \quad \text{Equation 4}$$

where W represents the horizontal distance between the large vehicle and the moving object on the road, f represents a focal distance of the rear camera module, w represents a horizontal distance between the contour point bottom of the moving object and the contour point of the large vehicle on a viewport taken by the rear camera module, and y represents a distance between the contour point bottom of the moving object and a vanishing point on the viewport filmed by the rear camera module.

The step (c) may include recognizing a contour point of the large vehicle and the contour point bottom of the moving object, calculating a vertical distance between the rear camera module and the moving object on the road based on Equation 2 below, calculating a horizontal distance between the large vehicle and the moving object on the road based on Equation 4 below, and outputting the collision risk signal when the vertical distance ranges from the minimum danger distance and the maximum danger distance which are predefined in the vertical direction and the horizontal distance is less than a predefined horizontal danger distance:

$$Z = \frac{fh}{y} \quad \text{Equation 2}$$

$$W = \frac{fw}{y}, \quad \text{Equation 4}$$

where Z represents the vertical distance between the rear camera module and the moving object on the road, f represents a focal distance of the rear camera module, h represents the height of the rear camera module from the ground surface, y represents a distance between the contour point bottom of the moving object and a vanishing point on a viewport filmed by the rear camera module, W represents the horizontal distance between the large vehicle and the moving object on the road, and w represents a horizontal distance between the contour point bottom of the moving object and the contour point of the large vehicle on the viewport taken by the rear camera module.

Advantageous Effects

In accordance with the embodiments of the present invention, the moving object collision warning system and method for a large vehicle may correctly identify a moving object such as a bicycle, two-wheeled vehicle or bicycle in a turning radius of a the large vehicle making a turn, and issue a warning to a driver or emergency-brake the large vehicle, thereby preventing a collision accident which occurs in a blind spot at the side rear of the large vehicle operated at low velocity.

MODE FOR INVENTION

Figure 1:
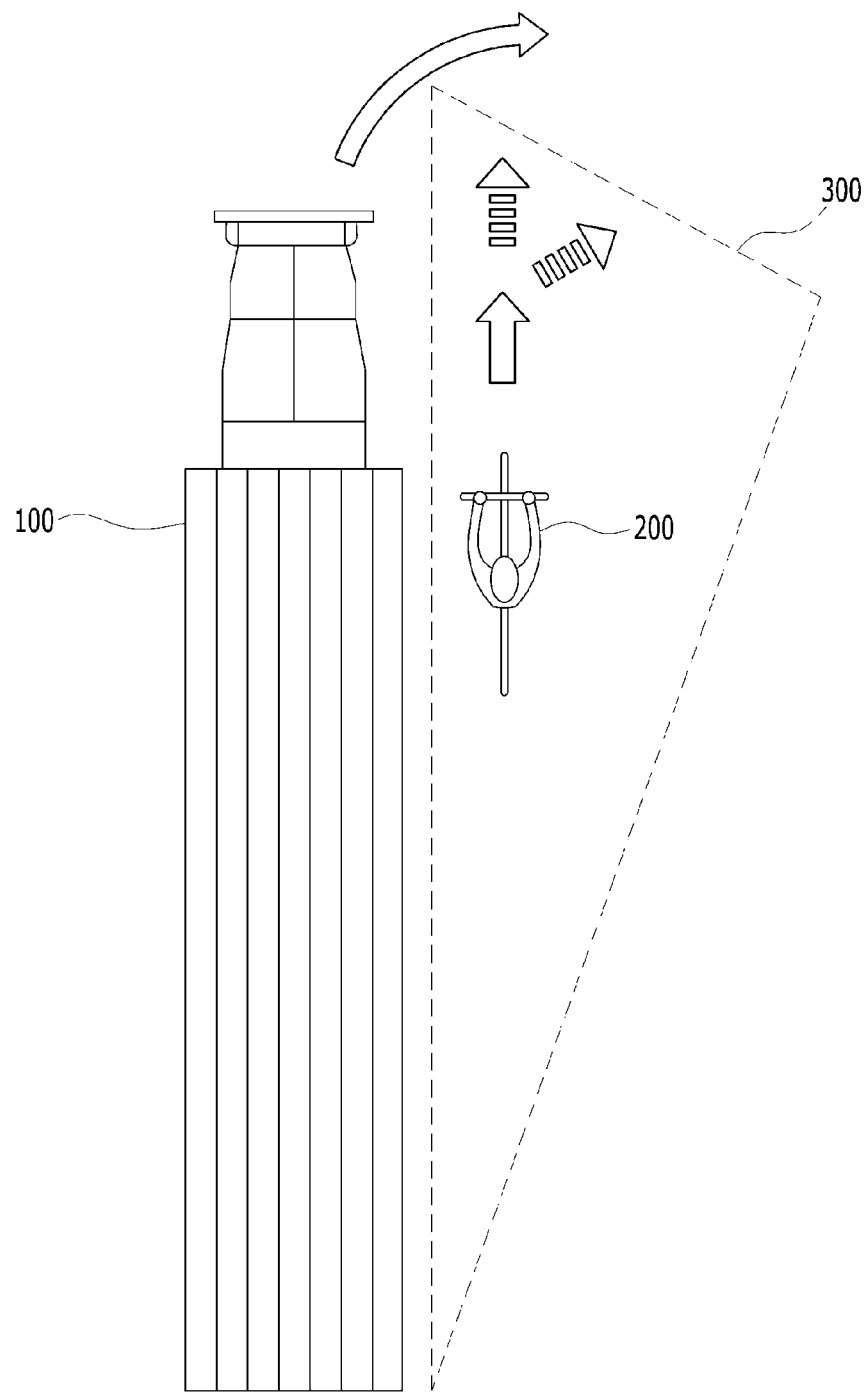
FIG. 1 is a plan view illustrating that a large vehicle makes a turn.
Figure 2:
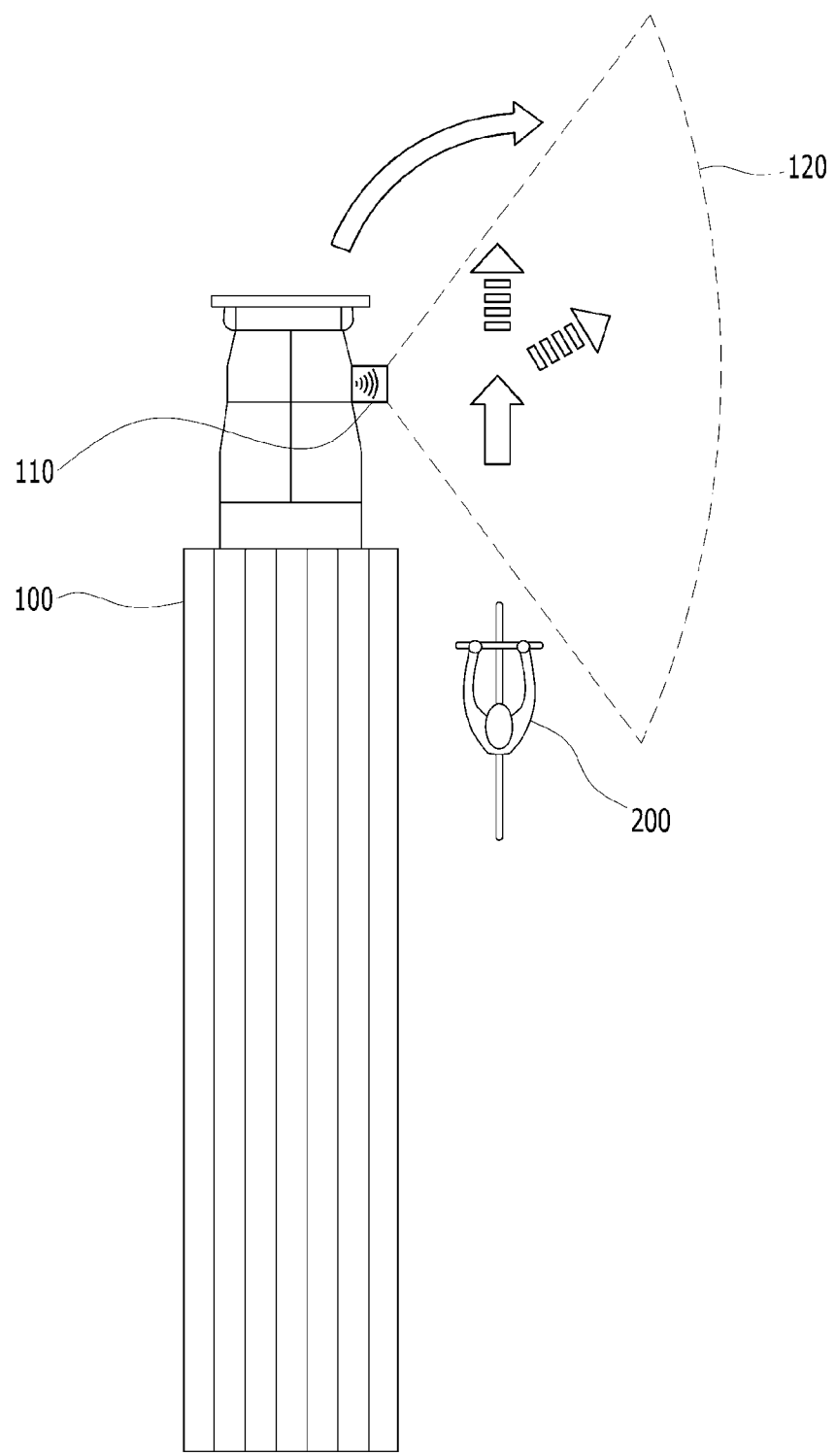
FIG. 2 is a plan view illustrating that a short range radar (SRR) is mounted on a large vehicle.

Hereafter, exemplary embodiments of the present invention will be described with reference to the accompanying drawings. However, the present invention is not limited to specific embodiments, and may include all variations, equivalents and substitutes within the scope of the present invention.

Throughout the specification, the same components are represented by like reference numerals. The accompanying drawings of this specification are for convenience of descriptions, and the shapes and relative scales thereof may be exaggerated or omitted.

When the embodiments are described in detail, the duplicated descriptions or the descriptions of techniques publicly known to those skilled in the art are omitted herein. In the following descriptions, when an element is referred to as "including" another element, the element may further include other elements unless referred to the contrary.

The terms "~ unit", "~er" and "~ module" described in the specification may indicate a unit for processing one or more functions or operations, and the unit can be embodied by hardware, software or a combination of hardware and software. Furthermore, when an element is referred to as being electrically connected to another element, it may not only indicate that the former element is directly connected to the latter element, but also indicate that the former element is connected to the latter element with another element interposed therebetween.

The present invention relates to a moving object collision warning system and method for a large vehicle, which correctly identifies a moving object in a turning radius of a large vehicle when the large vehicle makes a turn, and issues a warning to a driver or performs emergency braking. In the following descriptions, 'large vehicle' means a large vehicle such as a cargo truck, trailer, bus or heavy equipment, and 'moving object' means a moving object such as a bicycle, two-wheeled vehicle or pedestrian. The moving object collision warning system and method in accordance with the embodiment of the present invention can take an image of a danger zone through a rear camera module mounted on the side rear of the large vehicle, and identify a moving object such as a bicycle, two-wheeled vehicle or pedestrian in the taken image. Hereafter, a bicycle will be exemplified as the moving object, and a technique for identifying a bicycle may be equally applied to a two-wheeled vehicle such as a motorcycle or a moving object such as a pedestrian.

Figure 3:
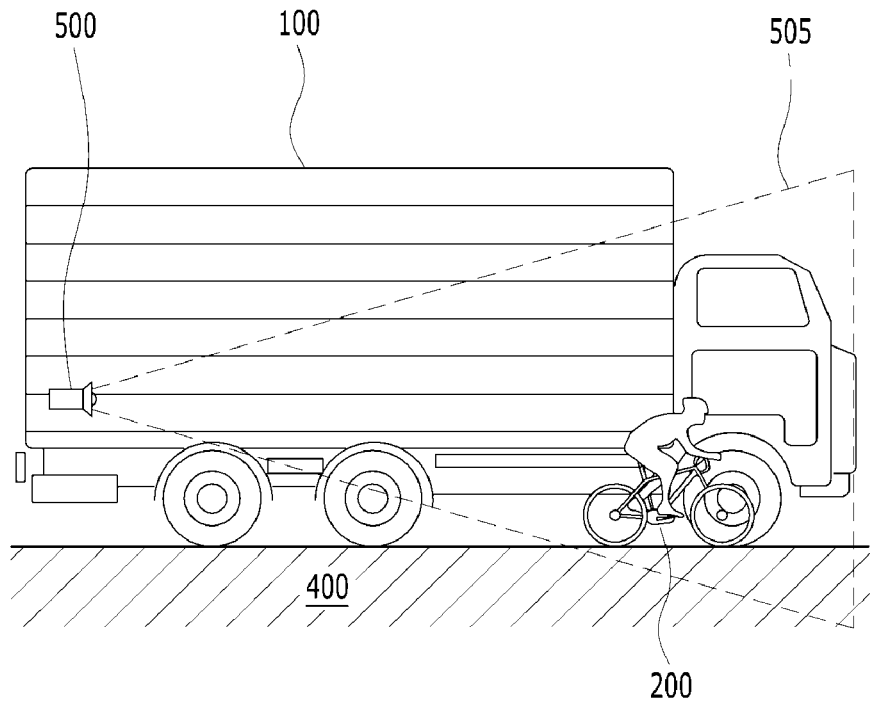
FIG. 3 illustrates that a rear camera module is mounted in accordance with an embodiment of the present invention.
Figure 3:
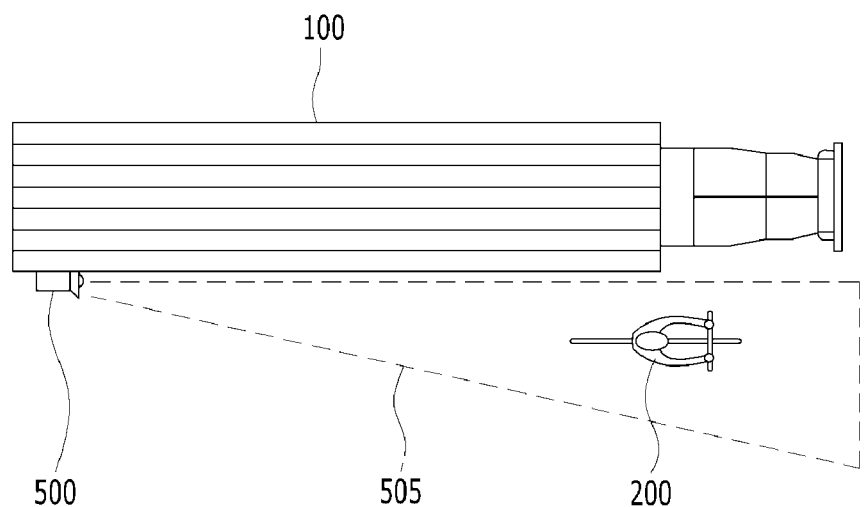

FIG. 3 illustrates that a rear camera module is mounted on a large vehicle in accordance with an embodiment of the present invention. Referring to FIG. 3, the rear camera module 500 is mounted at the rear of at least one side of a large vehicle 100. The rear camera module 500 may be mounted at the rear of the passenger-seat side surface of the large vehicle 100 in the traffic environment of Korea, and monitor a bicycle 200 within a monitoring zone 505 when the large vehicle 100 makes a right turn along a walkway. Although not illustrated, the rear camera module 500 may be mounted at the rears of both side surfaces of the large vehicle 100, and monitor a moving object such as the bicycle 200 when the large vehicle 100 makes a right or left turn in an inside road, for example.

As illustrated in the top of FIG. 3, the rear camera module 500 may be installed close to the ground surface 400 at the side rear of the large vehicle 100, and monitor the bicycle 200 located in parallel to the large vehicle 100. Furthermore, as illustrated in the bottom of FIG. 3, the rear camera module 500 has the monitoring zone 505 that faces forward to film the bicycle 200 and the side surface of the large vehicle 100 at the same time. In this case, a part of the viewing angle of the rear camera module 500 may be abandoned in order to film the side surface of the large vehicle 100 at the same time.

Figure 4:
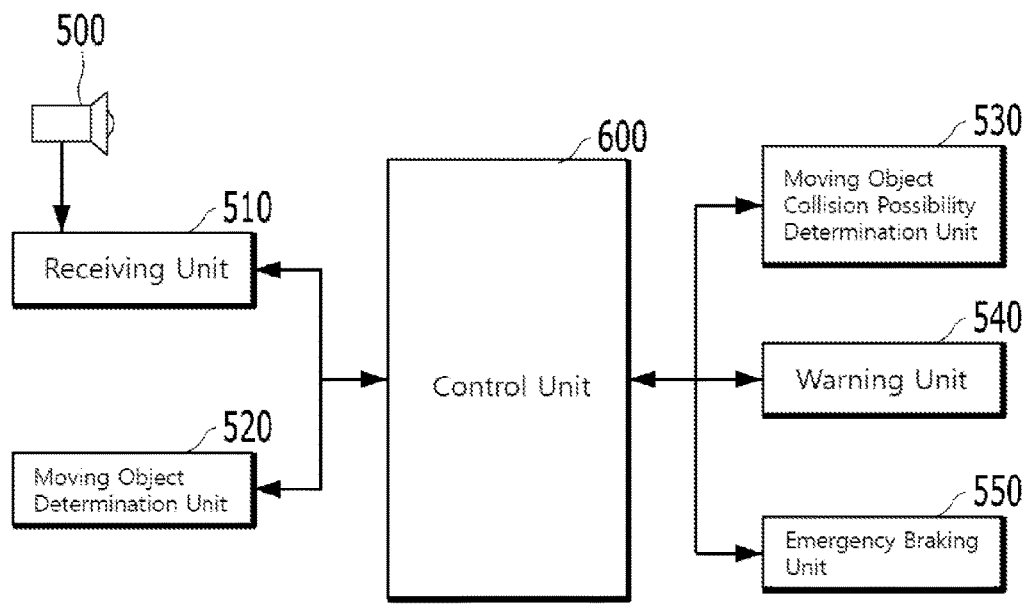
FIG. 4 is a block diagram illustrating a moving object collision warning system in accordance with an embodiment of the present invention.

FIG. 4 is a block diagram illustrating a moving object collision warning system in accordance with an embodiment of the present invention. Referring to FIG. 4, the moving object collision warning system for a vehicle in accordance with the embodiment of the present invention includes the rear camera module 500, an image receiving unit 510, a moving object determination unit 520, a moving object collision possibility determination unit 530, a warning unit 540, an emergency braking unit 550 and a control unit 600. The moving object collision warning system may be included in an ADAS (Advanced Driver Assistance System) or independently implemented as an apparatus for identifying a moving object and issuing a warning.

The image receiving unit 510 receives an image taken by the rear camera module 500. The moving object determination unit 520 may properly process the image taken by the rear camera module 500 and divide the image on a frame basis such that an image recognition unit at the rear stage can use the image frames. Then, the moving object determination unit 520 may store the image frames in a memory (not illustrated).

The moving object determination unit 520 recognizes the image received by the image receiving unit 510, extracts an object included in the image, and determines whether the extracted object is a moving object such as a bicycle, two-wheeled vehicle or pedestrian.

The moving object collision possibility determination unit 530 determines whether the moving object determined by the moving object determination unit 520 is located in a preset danger zone, and outputs a collision risk signal depending on the determination result. The process of determining a moving object through the moving object determination unit 520 and the process of determining a possibility of collision with a moving object through the moving object collision possibility determination unit 530 will be described later in detail with reference to the drawings following FIG. 4.

The warning unit 540 outputs a visual or audible warning signal to a driver of the large vehicle 100. For example, the warning unit 540 may output information using graphics or flickering light, the information indicating whether a moving object is present on a display shown to a driver. For another example, the warning unit 540 may output a voice message through a speaker installed in a warning system, the voice message saying that a moving object is present. For another example, the warning unit 540 may turn on a warning light or buzzer to issue a warning to a driver.

Preferably, the moving object collision possibility determination unit 530 may output a first collision risk signal when the moving object is located in the danger zone, and output a second collision risk signal when a change in steering angle of a steering wheel of the large vehicle 100 is sensed while the first collision risk signal is outputted.

The control unit 600 may operate a visual warning unit of the warning unit 540 when the first collision risk signal is generated, and inform the driver that the moving object such as the bicycle 200 is present around the vehicle. For example, the control unit 600 may call the attention of the driver by showing the bicycle as graphics on the display screen or flickering a sign of danger.

When the second collision risk signal is generated, the control unit 600 may operate the audible warning unit of the warning unit 540 to more actively inform the driver of the collision risk. For example, the warning unit 540 may output a voice message saying that the bicycle 200 is located in the turning radius or a voice message saying "bicycle collision risk" through the speaker, or output a buzzer sound, in order to inform the driver of the emergency situation.

Furthermore, when the second collision risk signal is generated, the control unit 600 may operate the emergency braking unit 550 to emergency-brake the vehicle. The emergency braking unit 550 may autonomously stop the vehicle without a brake manipulation of the driver. The control unit 600 may directly emergency-brake the vehicle in response to the second collision risk signal, or detect that the driver's brake manipulation is not performed and operate the emergency braking unit 550, even after the second collision risk signal was generated.

Figure 5:
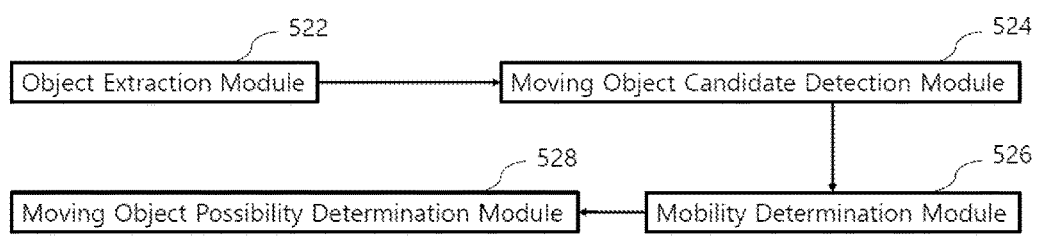
FIG. 5 is a block diagram illustrating a moving object determination unit in accordance with the embodiment of the present invention.

FIG. 5 is a block diagram illustrating the moving object determination unit in accordance with the embodiment of the present invention. Referring to FIG. 5, the moving object determination unit 520 of FIG. 4 includes an object extraction module 522, a moving object candidate detection module 524, a mobility determination module 526 and a moving object possibility determination module 528.

The object extraction module 522 extracts one or more objects in the image received by the image receiving unit 510. Here, 'object' includes both a dynamic object and a static object which are present in an image frame. The dynamic object may include a bicycle, two-wheeled vehicle and pedestrian, and the static object may include a tree, bollard for entry prevention and traffic light. The object extraction module 522 may detect an edge in an image frame or extract an object based on a color difference between the background and the object. For example, the object extraction module 522 may calculate the values of pixels in the image frame, group pixels having similar pixel values, and extract the grouped pixels as one object.

During the object extraction process, the object extraction module 522 may use the Canny edge detection algorithm, the line edge detection algorithm, the Laplacian edge detection algorithm or the like. The object extraction module 522 may detect a boundary line using such an algorithm, and extract an object by grouping areas distinguished from the background based on the detected boundary line.

The moving object candidate detection module 524 detects an edge of the object extracted by the object extraction module 522, and detects the object as a moving object candidate when the object has an area equal to or more than a predetermined size distinguished by the edge. The moving object candidate detection module 524 may extract a feature corresponding to a specific feature of the moving object from the object, compare the extracted feature to a previously stored pattern of the moving object, and remove an object unrelated to the moving object, for example, a stationary object.

For example, the moving object candidate detection module 524 may store the shape of bicycle wheels and a bicycle rider on the bicycle as a pattern, determine a similarity between the object extracted by the object extraction module 522 and the pattern of the bicycle, and detect a moving object candidate. For another example, the moving object candidate detection module 524 may detect the extracted object as a moving object candidate, when the extracted object is similar to a previously stored pedestrian pattern. The pedestrian pattern includes an upper part and a lower part which are defined based on a horizontal line corresponding to a position from which a vertical component diverges into two parts, the upper part has a length ranging from 60% to 140% of the length of the lower part, and the lower part diverges into two parts from the horizontal line.

The mobility determination module 526 detects a motion of the moving object candidate by comparing the current frame of the image taken by the rear camera module 500 to a previous frame before the current frame, and determines that the moving object candidate is moving, when the motion is detected.

Specifically, the mobility determination module 526 divides the current frame and the previous frame into a predetermined size of blocks, and calculates the sum of absolute differences in pixel value between a block including the moving object candidate in the current frame and a block including the moving object candidate in the previous frame, based on Equation 1 below. The mobility determination module 526 sets the block having the smallest sum of pixel value differences to the corresponding block of the previous block, and determines that the moving object candidate is moving, when the position of the corresponding block is changed.

$$SAD = \sum_{i=1}^{N} \sum_{j=1}^{M} |(I_{ij}(k) - I_{ij}(k-1))| \qquad \text{[Equation 1]}$$

In Equation 1, $I_{ij}(k)$ represents the pixel value of an i-th row and a j-th column of a block in a k-th image frame, and $I_{ij}(k-1)$ represents the pixel value of an i-th row and a j-th column of a block in the previous image frame before the k-th image frame.

The mobility determination module 526 calculates the sum of absolute differences (SAD) between blocks at positions corresponding to each other at the initial stage, and calculates SAD values while changing the positions of a specific block of the k-th image frame and a specific block of the (k−1)th image frame, the specific block indicating a block or blocks including the moving object candidate. Then, the mobility determination module 526 may set a block or blocks having the smallest SAD in the (k−1)th image frame to a block corresponding to the specific block of the k-th image frame.

After setting the corresponding block of the (k−1)th image frame, the mobility determination module 526 determines whether the moving object candidate is moving, based on whether the position of the corresponding block of the (k−1)th image frame was changed with respect to the position of the specific block of the k-th image frame. At this time, the previous image frame is not limited to the (k−1)th image frame, and a (k−10)th image frame corresponding to 10 frames before the k-th image frame may be used as the previous image frame.

When the mobility determination module 526 determines that the moving object candidate is moving, the moving object possibility determination module 528 performs a HOG (Histogram of Oriented Gradient) operation on the moving object candidate, and performs an SVM (Support Vector Machine) weight operation on the HOG operation result. When the operation result is equal to or more than a preset threshold value, the moving object possibility determination module 528 sets the moving object candidate to a moving object.

The HOG operation indicating the direction of an edge as histograms may be used when the shape of an object is not significantly changed and has a simple internal pattern and an object can be identified through the contour line of the object. For example, the moving object possibility determination module 528 calculates the direction of the edge by performing a HOG operation on a basis of a cell having a unit size of 8 pixels 8 pixels. The direction of the edge in the cell is standardized into eight angles, and expressed as histograms for the respective angles. The moving object possibility determination module 528 performs normalization on a block having a plurality of cells combined therein, and enumerates the normalized values to calculate a descriptor vector. The normalization includes a process of digitalizing the direction values of edges of the respective cells into an average value for the corresponding block. Then, the moving object possibility determination module 528 performs an SVM weight operation on the calculated descriptor vector, and sets the moving object candidate to a moving object when the value calculated through the SVM weight operation is equal to or more than the preset threshold value. Since the process of performing the SVM weight operation is obvious to those skilled in the art, the detailed descriptions thereof are omitted herein.

Figure 6:
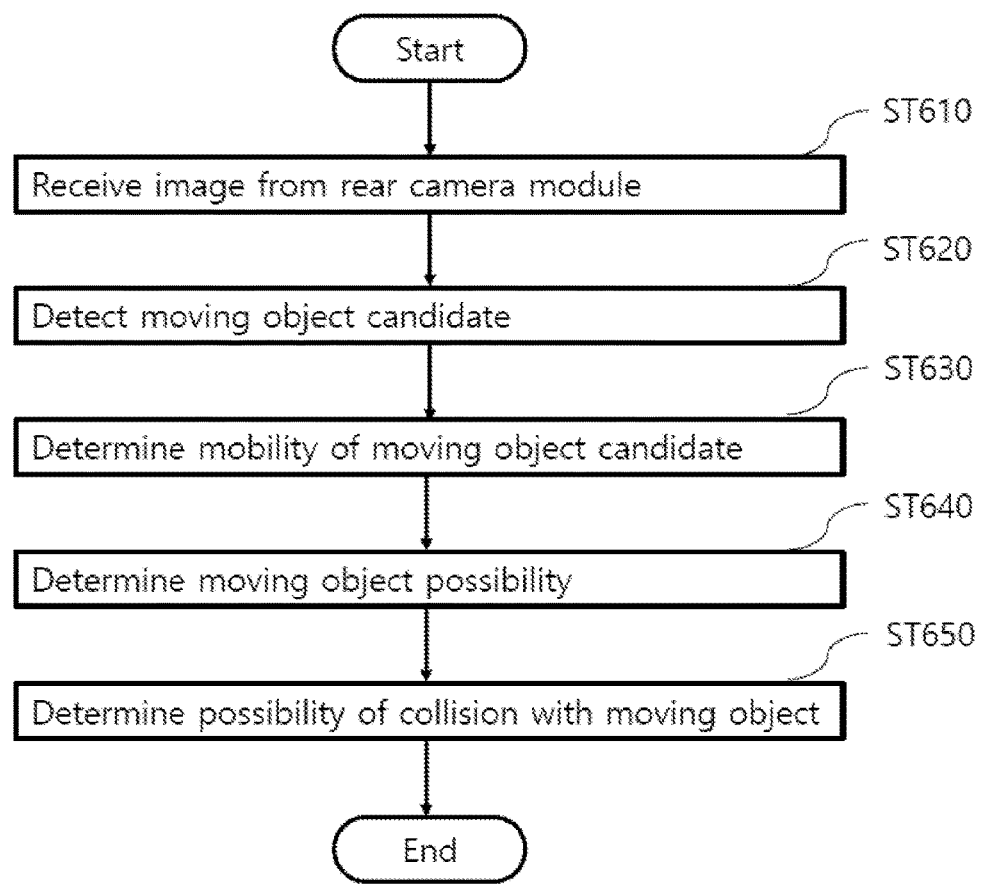
FIG. 6 is a flowchart illustrating a moving object collision warning method in accordance with an embodiment of the present invention.

FIG. 6 is a flowchart illustrating a moving object collision warning method in accordance with an embodiment of the present invention. Referring to FIG. 6, the moving object collision warning method begins with step ST610 in which the image receiving unit 510 receives an image from the rear camera module 500. As described above, the object extraction module 522 extracts objects from frames of the received image, and the moving object candidate detection module 524 detects a moving object candidate from the extracted objects, at ST620.

When the moving object candidate is detected, the mobility determination module 526 determines similarities between the moving object candidate and the predefined patterns of a bicycle, two-wheeled vehicle and pedestrian, and determines whether the moving object candidate is moving, at step ST630. When it is determined that the moving object candidate is moving, the moving object possibility determination module 528 performs a HOG operation and SVM weight operation on the moving object candidate, and finally sets the moving object candidate to a moving object, at step ST640.

Then, the moving object collision possibility determination unit 530 determines a possibility of collision with the moving object at step ST650. The process of determining the possibility of collision with the moving object and operating the warning unit 540 or the emergency braking unit 550 will be described later with reference to FIGS. 7 to 9.

Figure 7:
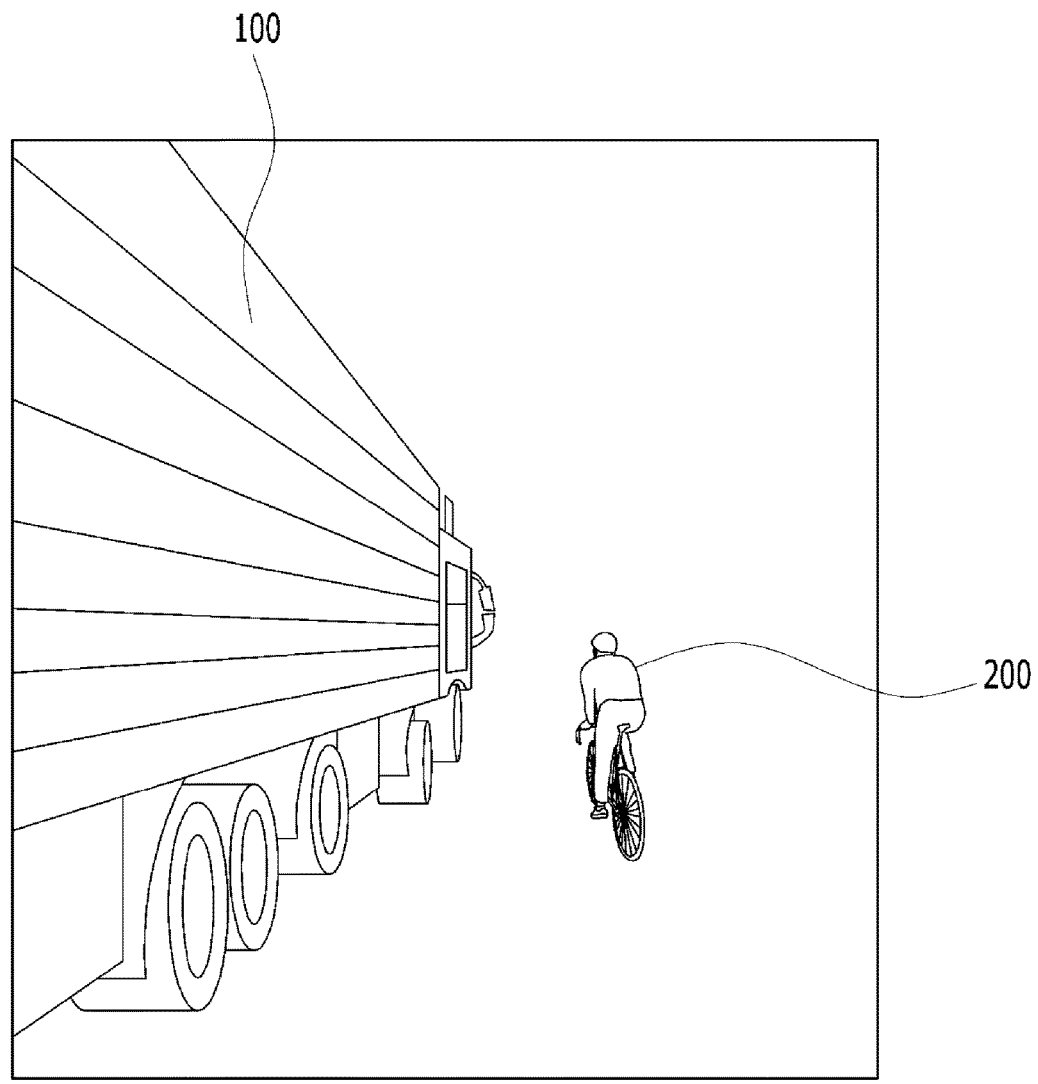
FIG. 7 illustrates an image taken by a rear camera module in accordance with the embodiment of the present invention.

FIG. 7 illustrates an image taken by the rear camera module in accordance with the embodiment of the present invention. As described with reference to FIG. 3, the rear camera module 500 is mounted at the side rear of the large vehicle 100 and faces forward to film a forward situation. Thus, as illustrated in FIG. 7, the side of the large vehicle 100 is always displayed on the left side of the viewport. The size of the object filmed by the rear camera module seems to decrease toward the front of the vehicle, due to the near and far degree. When the bicycle 200 is located close to the right side of the large vehicle 100, an image of the bicycle 200 will be displayed at the right side of the large vehicle 100 as illustrated in FIG. 7.

Figure 8:
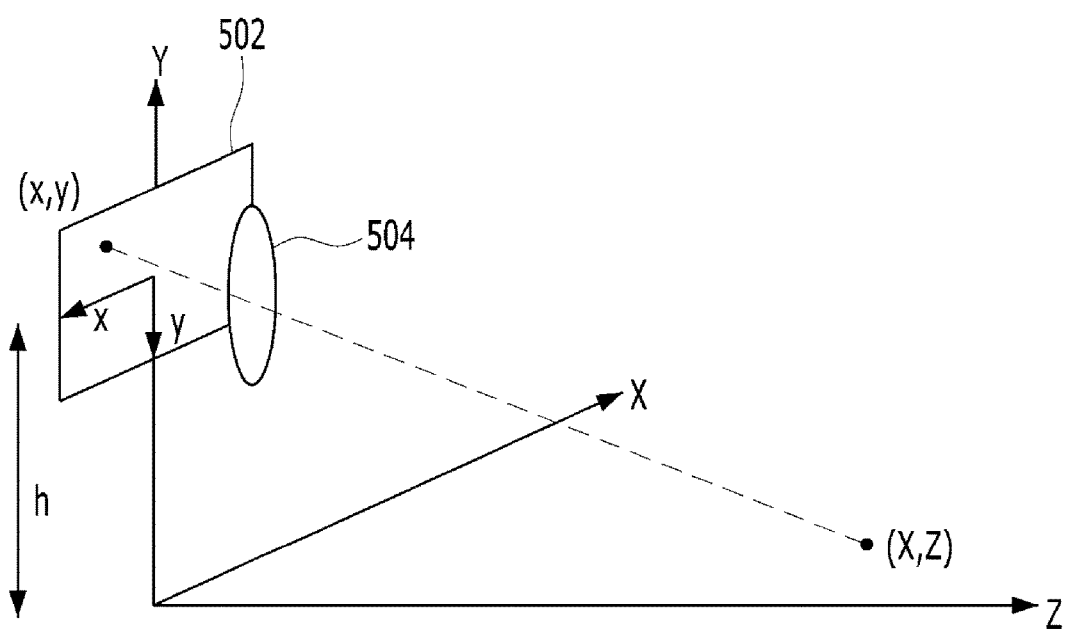
FIG. 8 is a graph illustrating a correlation between an actual coordinate system and a camera viewport coordinate system.

FIG. 8 illustrates the correlation between an actual coordinate system and a camera viewport coordinate system. As illustrated in FIG. 8, an actual coordinate (X, Y) on the road may be refracted by a lens 504, and projected onto a point (x, y) on a camera viewport 502 detected by a sensor of the camera.

When a recognized coordinate (X, Z) indicates the contour point bottom of the moving object, a distance between the rear camera module 500 on the road and the recognized coordinate (X, Z) may be decided through Equation 2 below.

$$Z = \frac{fh}{y} \qquad \text{[Equation 2]}$$

In Equation 2, Z represents a vertical distance between the rear camera module and the moving object on the road, f represents a focal distance of the rear camera module, h represents the height of the rear camera module from the ground surface, and y represents a distance between the contour point bottom of the moving object and the vanishing point on the viewport filmed by the rear camera module.

The X-axis distance of the coordinate (X, Z) may be decided through the Equation 3 below.

$$X = \frac{fx}{y} \qquad \text{[Equation 3]}$$

In Equation 3, X represents a horizontal distance between the rear camera module and the moving object on the road, and x represents a distance between the contour point bottom of the moving object and the vanishing point on the viewport filmed by the rear camera module.

Figure 9:
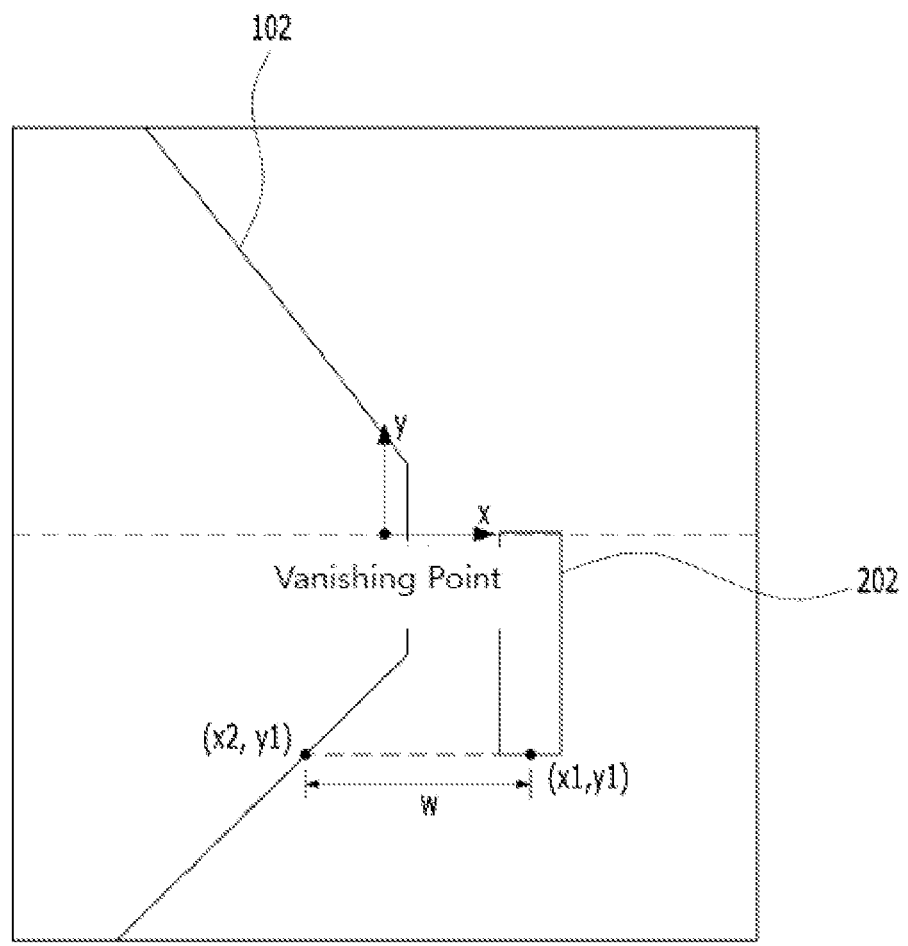
FIG. 9 illustrates a process of determining a collision possibility of a bicycle based on the image of FIG. 7.

FIG. 9 illustrates a process of determining a collision possibility of the bicycle based on the image of FIG. 7. Referring to FIG. 9, a large vehicle contour line 102 and a bicycle contour line 202 may be obtained from the forward image of FIG. 7. In the forward image, the origin point indicates the vanishing point, the contour point bottom of the bicycle based on the vanishing point has a coordinate (x1, y1), and a contour point of the large vehicle, extended in the horizontal direction from the contour point bottom of the bicycle, has a coordinate (x2, y1).

That is, the distance between the large vehicle 100 and the bicycle 200 can be recognized. When the actual distance between the large vehicle 100 and the bicycle 200 on the road is represented by 'W', this value may be obtained through Equation 4 below.

$$W = \frac{fw}{y} \qquad \text{[Equation 4]}$$

In Equation 4, W represents a horizontal distance between the large vehicle and the moving object on the road, and w represents a horizontal distance between the contour point bottom of the moving object and the contour point of the large vehicle on the viewport taken by the rear camera module.

When the vertical distance Z between the rear camera module and the moving object on the road, calculated through Equation 2, ranges from the minimum danger distance and the maximum danger distance which are predefined in the vertical direction, the moving object collision possibility determination unit 530 may output the above-described first collision risk signal. For another example, when the horizontal distance W between the large vehicle and the moving object on the road, calculated through Equation 4, is less than a predefined horizontal danger distance, the moving object collision possibility determination unit 530 may output the above-described first collision risk signal.

Preferably, when the two conditions are all satisfied, the moving object collision possibility determination unit 530 outputs the first collision risk signal. When a change in steering angle of the steering wheel of the large vehicle is sensed while the condition in which the first collision risk signal is generated is satisfied, the moving object collision possibility determination unit 530 may output the second collision risk signal.

When the first collision risk signal is generated, the control unit 600 may operate the visual warning unit of the warning unit 540 to display information on the display screen, the information indicating that a moving object such as the bicycle 200 is present around the vehicle. When the second collision risk signal is generated, the control unit 600 may output a visual warning signal such as a warning light or generate an audible warning signal through a speaker or buzzer. Furthermore, since a fatal situation such as death can be caused even by a low-speed collision accident when the second collision risk signal is generated, the control unit 600 may operate the emergency braking unit 550 to emergency-brake the vehicle even when the driver does not operate the brake, thereby preventing a loss of life.

While various embodiments have been described above, it will be understood to those skilled in the art that the embodiments described are by way of example only. Accordingly, the disclosure described herein should not be limited based on the described embodiments.

What is claimed is:

1. A moving object collision warning system for a large vehicle, comprising:
   a rear camera module mounted on the rear of at least one side of a large vehicle, and configured to take an image of an object while facing the front of the large vehicle;
   an image receiving unit configured to receive the image taken by the rear camera module;
   a moving object determination unit configured to recognize the image received by the image receiving unit, extract an object included in the image, and determine whether the extracted object is a moving object, wherein the moving object includes one or more of a bicycle, a two-wheeled vehicle and a pedestrian;
   a moving object collision possibility determination unit configured to determine whether the moving object determined by the moving object determination unit is located in a preset danger zone, and output a collision risk signal;
   a warning unit configured to output a visual or audible warning signal to a driver of the large vehicle; and
   a controller configured to operate the warning unit when the moving object collision possibility determination unit outputs the collision risk signal,
   wherein the moving object collision possibility determination unit recognizes the contour point bottom of the moving object, calculates a vertical distance between the rear camera module and the moving object on the road based on Equation 2 below, and outputs the collision risk signal when the vertical distance ranges from the minimum danger distance and the maximum danger distance which are predefined in the vertical direction:

$$Z = \frac{fh}{y}, \qquad \text{Equation 2}$$

where Z represents the vertical distance between the rear camera module and the moving object on the road, f represents a focal distance of the rear camera module, h represents the height of the rear camera module from the ground surface, and y represents a distance between the contour point bottom of the moving object and a vanishing point on a viewport filmed by the rear camera module.

2. The moving object collision warning system of claim 1, wherein the moving object possibility determination unit outputs a first collision risk signal when the moving object is located in the danger zone, and outputs a second collision risk signal when a change in steering angle of a steering wheel of the large vehicle is sensed while the first collision risk signal is outputted.

3. The moving object collision warning system of claim 2, wherein the control unit operates a visual warning unit of the warning unit in response to the first collision risk signal, and operates an audible warning unit of the warning unit in response to the second collision risk signal.

4. The moving object collision warning system of claim 2, further comprising an emergency braking unit configured to emergency-brake the large vehicle,
wherein the control unit operates the emergency braking unit in response to the second collision risk signal.

5. The moving object collision warning system of claim 1, wherein the moving object determination unit comprises:
an object extraction module configured to extract one or more objects from the image received by the image receiving unit;
a moving object candidate detection module configured to detect an edge of the object extracted by the object extraction module, and detect the object as a moving object candidate when the object has an area equal to or more than a predetermined size distinguished by the edge;
a mobility determination module configured to detect a motion of the moving object candidate by comparing the current frame of the image taken by the rear camera module to a previous frame before the current frame, and determine that the moving object candidate is moving, when the motion is detected; and
a moving object possibility determination module configured to perform a HOG (Histogram of Oriented Gradient) operation on the moving object candidate when the mobility determination module determines that the moving object candidate is moving, perform an SVM (Support Vector Machine) weight operation on the HOG operation result, and set the moving object candidate to a moving object when the operation result is equal to or more than a preset threshold value.

6. The moving object collision warning system of claim 5, wherein the moving object candidate detection module detects a vertical component of the edge of the object, and determines a similarity between the vertical component and a predefined pattern of the moving object, in order to detect the moving object candidate.

7. The moving object collision warning system of claim 5, wherein the mobility determination module divides the current frame and the previous frame into a predetermined size of blocks, calculates the sum of differences in pixel value between a block including the moving object candidate in the current frame and a block including the moving object candidate in the previous frame, based on Equation 1 below, sets the block having the smallest sum of pixel value differences to the corresponding block of the previous block, and determines that the moving object candidate is moving, when the position of the corresponding block is changed:

$$SAD = \sum_{i=1}^{N} \sum_{j=1}^{M} |(I_{ij}(k) - I_{ij}(k-1))|, \quad \text{Equation 1}$$

where $I_{ij}(k)$ represents the pixel value of an i-th row and a j-th column of a block in a k-th image frame, and $I_{ij}(k-1)$ represents the pixel value of an i-th row and a j-th column of a block in the previous image frame before the k-th image frame.

8. A moving object collision warning system for a large vehicle, comprising:
a rear camera module mounted on the rear of at least one side of a large vehicle, and configured to take an image of an object while facing the front of the large vehicle;
an image receiving unit configured to receive the image taken by the rear camera module;
a moving object determination unit configured to recognize the image received by the image receiving unit, extract an object included in the image, and determine whether the extracted object is a moving object, wherein the moving object includes one or more of a bicycle, a two-wheeled vehicle and a pedestrian;
a moving object collision possibility determination unit configured to determine whether the moving object determined by the moving object determination unit is located in a preset danger zone, and output a collision risk signal;
a warning unit configured to output a visual or audible warning signal to a driver of the large vehicle; and
a controller configured to operate the warning unit when the moving object collision possibility determination unit outputs the collision risk signal,
wherein the moving object collision possibility determination unit recognizes a contour point of the large vehicle and the contour point bottom of the moving object, calculates a horizontal distance between the large vehicle and the moving object on the road based on Equation 4 below, and outputs the collision risk signal when the horizontal distance is less than a predefined horizontal danger distance:

$$W = \frac{fw}{y}, \quad \text{Equation 4}$$

where W represents the horizontal distance between the large vehicle and the moving object on the road, f represents a focal distance of the rear camera module, w represents a horizontal distance between the contour point bottom of the moving object and the contour point of the large vehicle on a viewport taken by the rear camera module, and y represents a distance between the contour point bottom of the moving object and the vanishing point on the viewport filmed by the rear camera module.

9. A moving object collision warning system for a large vehicle, comprising:
a rear camera module mounted on the rear of at least one side of a large vehicle, and configured to take an image of an object while facing the front of the large vehicle;
an image receiving unit configured to receive the image taken by the rear camera module;
a moving object determination unit configured to recognize the image received by the image receiving unit, extract an object included in the image, and determine whether the extracted object is a moving object, wherein the moving object includes one or more of a bicycle, a two-wheeled vehicle and a pedestrian;
a moving object collision possibility determination unit configured to determine whether the moving object determined by the moving object determination unit is located in a preset danger zone, and output a collision risk signal;
a warning unit configured to output a visual or audible warning signal to a driver of the large vehicle; and
a controller configured to operate the warning unit when the moving object collision possibility determination unit outputs the collision risk signal,
wherein the moving object collision possibility determination unit recognizes a contour point of the large vehicle and the contour point bottom of the moving object, calculates a vertical distance between the rear camera module and the moving object on the road based on Equation 2 below, calculates a horizontal distance between the large vehicle and the moving object on the road based on Equation 4 below, and outputs the collision risk signal when the vertical distance ranges from the minimum danger distance and the maximum danger distance which are predefined in the vertical direction and the horizontal distance is less than a predefined horizontal danger distance:

$$Z = \frac{fh}{y} \quad \text{Equation 2}$$

$$W = \frac{fw}{y}, \quad \text{Equation 4}$$

where Z represents the vertical distance between the rear camera module and the moving object on the road, f represents a focal distance of the rear camera module, h represents the height of the rear camera module from the ground surface, y represents a distance between the contour point bottom of the moving object and a vanishing point on a viewport filmed by the rear camera module, W represents the horizontal distance between the large vehicle and the moving object on the road, and w represents a horizontal distance between the contour point bottom of the moving object and the contour point of the large vehicle on the viewport taken by the rear camera module.

10. A moving object collision warning method for a large vehicle, comprising the steps of:
   (a) receiving, by an image receiving unit, an image from a rear camera module which is mounted on the rear of at least one side of the large vehicle and takes an image of an object while facing the front of the large vehicle;
   (b) extracting, by a moving object determination unit, an object included in the received image, and determining whether the extracted object is a moving object, wherein the moving object includes one or more of a bicycle, a two-wheeled vehicle and a pedestrian;
   (c) outputting, by a moving object collision possibility determination unit, a collision risk signal when the moving object determined at the step (b) is located in a preset danger zone; and
   (d) outputting, by a warning unit, a visual or audible warning signal in response to the collision risk signal,
wherein the step (c) comprises recognizing the contour point bottom of the moving object, calculating a vertical distance between the rear camera module and the moving object on the road based on Equation 2 below, and outputting the collision risk signal when the vertical distance ranges from the minimum danger distance and the maximum danger distance which are predefined in the vertical direction:

$$Z = \frac{fh}{y}, \quad \text{Equation 2}$$

where Z represents the vertical distance between the rear camera module and the moving object on the road, f represents a focal distance of the rear camera module, h represents the height of the rear camera module from the ground surface, and y represents a distance between the contour point bottom of the moving object and a vanishing point on a viewport filmed by the rear camera module.

11. The moving object collision warning method of claim 10, wherein the step (c) comprises the steps of:
   (c-1) outputting a first collision risk signal when the moving object is located in the danger zone; and
   (c-2) outputting a second collision risk signal when a change in steering angle of a steering wheel of the large vehicle is sensed while the condition of the step (c-1) is satisfied.

12. The moving object collision warning method of claim 11, wherein the step (d) comprises outputting a visual warning signal in response to the first collision risk signal, and outputting an audible warning signal in response to the second collision risk signal.

13. The moving object collision warning method of claim 11, further comprising emergency-braking, by an emergency braking unit, the large vehicle in response to the second collision risk signal, after the step (d).

14. The moving object collision warning method of claim 10, wherein the step (b) comprises the steps of:
   (b-1) extracting one or more objects from the received image;
   (b-2) detecting an edge of the extracted object, and detecting the object as a moving object candidate when the object has an area equal to or more than a predetermined size distinguished by the edge;
   (b-3) detecting a motion of the moving object candidate by comparing the current frame of the image taken by the rear camera module to a previous frame before the current frame, and determining that the moving object candidate is moving, when the motion is detected; and
   (b-4) performing a HOG operation on the moving object candidate when it is determined at the step (b-3) that the moving object candidate is moving, performing an SVM weight operation on the HOG operation result, and setting the moving object candidate to a moving object when the operation result is equal to or more than a preset threshold value.

15. The moving object collision warning method of claim 14, wherein the step (b-2) comprises detecting a vertical component of the edge of the object, and determining a similarity between the vertical component and a predefined pattern of the moving object, in order to detect the moving object candidate.

16. The moving object collision warning method of claim 14, wherein the step (b-3) comprises dividing the current frame and the previous frame into a predetermined size of blocks, calculating the sum of differences in pixel value between a block including the moving object candidate in the current frame and a block including the moving object candidate in the previous frame, based on Equation 1 below, setting the block having the smallest sum of pixel value differences to the corresponding block of the previous block, and determining that the moving object candidate is moving, when the position of the corresponding block is changed:

$$SAD = \sum_{i=1}^{N} \sum_{j=1}^{M} |(I_{ij}(k) - I_{ij}(k-1))|, \quad \text{Equation 1}$$

where $I_{ij}(k)$ represents the pixel value of an i-th row and a j-th column of a block in a k-th image frame, and $I_{ij}(k-1)$ represents the pixel value of an i-th row and a j-th column of a block in the previous image frame before the k-th image frame.

17. A moving object collision warning method for a large vehicle, comprising the steps of:
    (a) receiving, by an image receiving unit, an image from a rear camera module which is mounted on the rear of at least one side of the large vehicle and takes an image of an object while facing the front of the large vehicle;
    (b) extracting, by a moving object determination unit, an object included in the received image, and determining whether the extracted object is a moving object, wherein the moving object includes one or more of a bicycle, a two-wheeled vehicle and a pedestrian;
    (c) outputting, by a moving object collision possibility determination unit, a collision risk signal when the moving object determined at the step (b) is located in a preset danger zone; and
    (d) outputting, by a warning unit, a visual or audible warning signal in response to the collision risk signal,
    wherein the step (c) comprises recognizing a contour point of the large vehicle and the contour point bottom of the moving object, calculating a horizontal distance between the large vehicle and the moving object on the road based on Equation 4 below, and outputting the collision risk signal when the horizontal distance is less than a predefined horizontal danger distance:

$$W = \frac{fw}{y}, \quad \text{Equation 4}$$

where W represents the horizontal distance between the large vehicle and the moving object on the road, f represents a focal distance of the rear camera module, w represents a horizontal distance between the contour point bottom of the moving object and the contour point of the large vehicle on a viewport taken by the rear camera module, and y represents a distance between the contour point bottom of the moving object and a vanishing point on the viewport filmed by the rear camera module.

18. A moving object collision warning method for a large vehicle, comprising the steps of:
    (a) receiving, by an image receiving unit, an image from a rear camera module which is mounted on the rear of at least one side of the large vehicle and takes an image of an object while facing the front of the large vehicle;
    (b) extracting, by a moving object determination unit, an object included in the received image, and determining whether the extracted object is a moving object, wherein the moving object includes one or more of a bicycle, a two-wheeled vehicle and a pedestrian;
    (c) outputting, by a moving object collision possibility determination unit, a collision risk signal when the moving object determined at the step (b) is located in a preset danger zone; and
    (d) outputting, by a warning unit, a visual or audible warning signal in response to the collision risk signal,
    wherein the step (c) comprises recognizing a contour point of the large vehicle and the contour point bottom of the moving object, calculating a vertical distance between the rear camera module and the moving object on the road based on Equation 2 below, calculating a horizontal distance between the large vehicle and the moving object on the road based on Equation 4 below, and outputting the collision risk signal when the vertical distance ranges from the minimum danger distance and the maximum danger distance which are predefined in the vertical direction and the horizontal distance is less than a predefined horizontal danger distance:

$$Z = \frac{fh}{y} \quad \text{Equation 2}$$

$$W = \frac{fw}{y}, \quad \text{Equation 4}$$

where Z represents the vertical distance between the rear camera module and the moving object on the road, f represents a focal distance of the rear camera module, h represents the height of the rear camera module from the ground surface, y represents a distance between the contour point bottom of the moving object and a vanishing point on a viewport filmed by the rear camera module, W represents the horizontal distance between the large vehicle and the moving object on the road, and w represents a horizontal distance between the contour point bottom of the moving object and the contour point of the large vehicle on the viewport taken by the rear camera module.

* * * * *